UNITED STATES PATENT OFFICE.

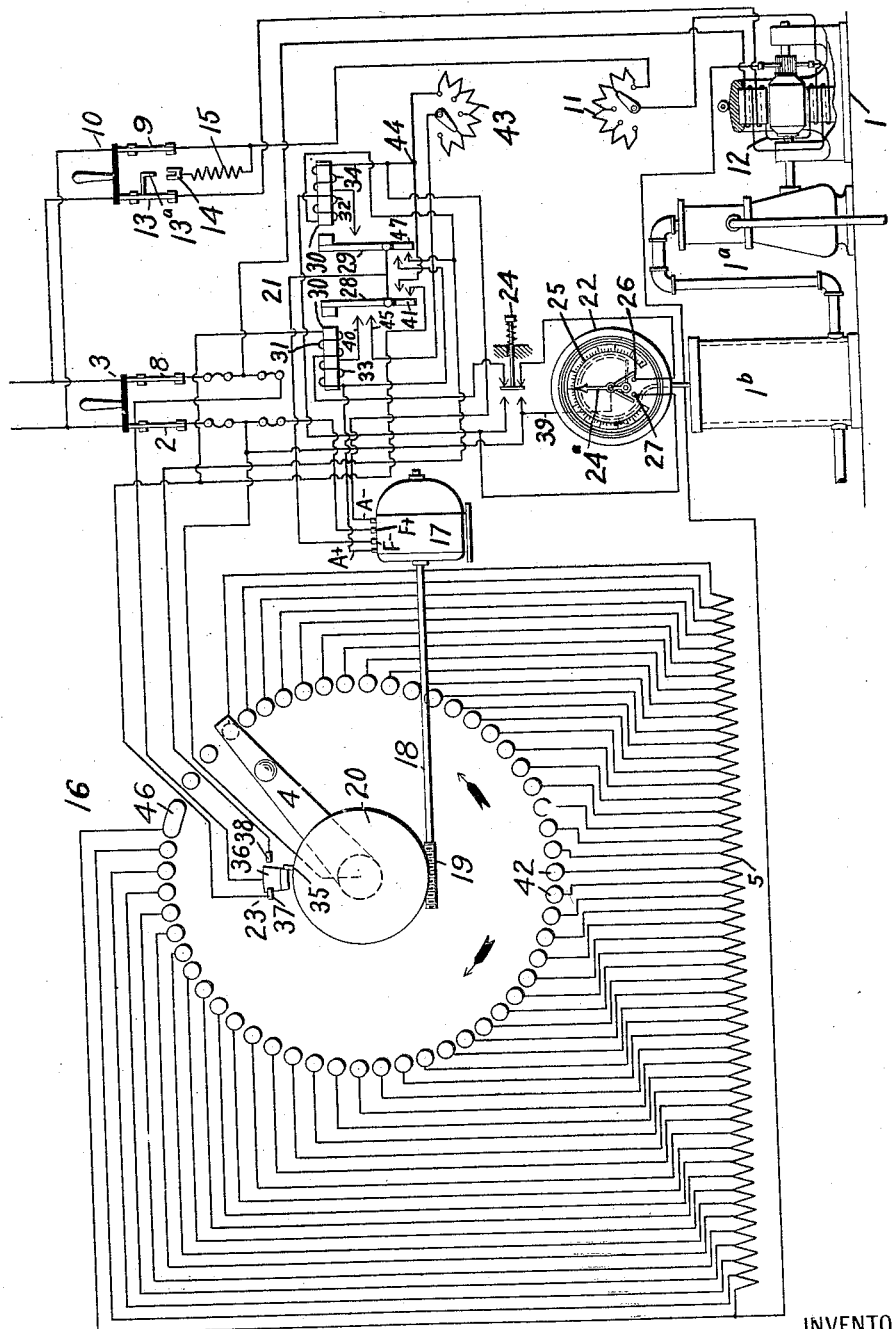

HARVE R. STUART, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF MOTOR CONTROL.

No. 819,816.  Specification of Letters Patent.  Patented May 8, 1906.

Application filed January 20, 1904. Serial No. 189,887.

*To all whom it may concern:*

Be it known that I, HARVE R. STUART, a citizen of the United States, and a resident of Wilkinsburg, in the county of Allegheny and State of Pennsylvania, have invented a new and useful Improvement in Systems of Motor Control, of which the following is a specification.

My invention relates to systems of motor control; and it has for its object to provide a system of control for motors which operate air compressors, pumps, and similar apparatus in which it is desirable to have the motors start and stop automatically according as the pressure falls below or rises above certain predetermined limits.

My invention is illustrated in the accompanying drawing, the single figure of which is a diagram of a system of motor control organized in accordance therewith.

The armature and series field-magnet winding of a compound-wound motor 1, which operates a fluid-pump 1ª or similar apparatus, are connected to one side of a supply-circuit through the blade 2 of a main switch 3, a rheostat-arm 4, and more or less of a variable resistance 5 and to the other side of such circuit through the other blade 8 of the main switch 3. The shunt-winding of the field-magnet of the motor is connected at one side to the supply-circuit through the blade 9 of a field-discharge switch 10 and a rheostat 11 and at the other side through the other blade 13 of the switch 10. When the switch 10 is opened, a projection 13ª pertaining to the blade 13 is brought into engagement with a contact-piece 14, thus effecting a discharge of the shunt-field 12 through a resistance 15.

The main rheostat 16 is operated and controlled by a small series motor 17, the armature-shaft 18 of which is geared, by means of a worm 19 and a worm-wheel 20, to the contact-arm 4. The field-magnet leads F + and F − and the armature-leads A + and A − of the motor are connected to the line and to a relay apparatus 21, a pressure-gage relay 22, a limit-switch 23, and a push-button switch 24 in the manner shown and as will be more fully set forth in a description of the various circuits.

The pressure-gage relay 22 comprises suitable mechanism which indicates the fluid-pressure in a storage-reservoir 1ᵇ and automatically opens or closes the proper relay-circuits when the pressure exceeds or falls below certain predetermined limits. It comprises a pressure-actuated pointer 24ª, which indicates the pressure on a scale 25 and which actuates the one or the other of the switches 27 and 26, according as the pressure is at its upper or lower limit. It is of course understood that this pressure-gage relay may be operated by means of any kind of pressure that the operation of the motor 1 will produce—i. e., the apparatus which may be operated by the main motor 1 may be of almost any desired description.

The relay apparatus 21 is employed for the purpose of selecting the proper circuits through the motor 17 when the pressure reaches the lower limit and the motor is to be started or when it has reached the upper limit and the motor is to be stopped. This relay comprises two switch-levers 28 and 29, adapted to make contact with the proper stationary contact-terminals and electromagnets 30 for operating the said levers. One of the magnets 30 is provided with a winding 31 and the other with a winding 32, which are respectively energized by the closing of the pressure-gage-relay switch 26 and the corresponding switch 27. One of the magnets is also provided with a winding 33 and the other with a corresponding winding 34, the one or the other of which is closed when the circuits of the operating-motor 17 are closed, the latter two windings being severally arranged for connection in series with the operating-motor circuit in order to insure the retention of the corresponding switch-lever in closed position regardless of the fluctuations of the pressure-gage-relay pointer 24ª.

The limit-switch 23 is adapted to open and close the proper relay-circuits when the rheostat-arm 4 has reached the limits of its movement, for which purpose any suitable device may be employed. That which I have indicated comprises a lug 35 on the gear 20, which engages at the limits of the movement of the rheostat-arm 4 with the movable terminal-block 36, and thereby moves it into contact with the one or the other of the terminals 37 and 38, according to the direction of rotation of said arm.

To start the main motor 1, the field-discharge switch 10 is first closed and then the main switch 3. The circuit is then complete from the line through the main-switch blade 2 of the switch 3, the conductor 39, switch 26 of the pressure-gage relay 22, push-button switch 24, relay-magnet coil 31, contact 37 of the limit-switch 23 to the line by way of the blade 8 of the main switch 3. The energizing of the magnet-coil 31 operates the switch-lever 28, and the circuit through the operating-motor 17 is from the line through the main-switch blade 2, the field-magnet winding from F+ to F−, relay-switch lever 28, contact-terminal 40, magnet-coil 33, the armature from A+ to A−, the insulated end 41 of the switch-lever 28, contact 37 of the limit-switch 23, to the line through the main-switch blade 8. A variable resistance 43 is provided in a shunt to the main circuit through the operating-motor 17 for the purpose of varying the current delivered to the motor, connection to the circuit being made at the point 44 and at switch-lever 28 by the contact-point 45.

The motor 17 causes the switch-arm 4 to move over the contacts 42 and to thus cut resistance out of the circuit of the main motor, which gradually speeds up as a result. When the switch-arm has moved to the last contact-terminal 46, the movable terminal 36 of the limit-switch 23 is thrown to make contact with the terminal 38, thus interrupting the circuits through the relay-magnet coils 31 and 33, releasing the switch-lever 28 and interrupting the circuit of the operating-motor 17, which comes to a stop.

The main motor 1 now runs at full speed until the pressure in the reservoir 1ᵇ rises to the upper limit and causes the switch 27 of the pressure-gage relay 22 to close the circuit from the line through the main-switch blade 2, the conductor 39, switch 27, relay-magnet coil 32, contact-terminal 38, and movable terminal 36 of the limit-switch 23, to the line through the main-switch blade 8. Operation of the relay-switch lever 29 then ensues, and the circuit is closed from the line through the main-switch blade 2, the field-magnet winding of the operating-motor 17 from F+ to F−, one end of switch-lever 29, magnet-coil 34, the operating-motor armature from A− to A+, the insulated end 47 of the switch-lever 29, and the limit-switch 23 to the line. The direction of the current has now been reversed through the armature of the operating-motor, and hence also the direction of rotation. Resistance is gradually cut into the circuit of the main motor by the backward movement of the rheostat-arm 4, thus bringing it to a stop, and when said rheostat-arm has reached the last notch it automatically throws the movable terminal 36 to engage with the contact-terminal 37 of the limit-switch 23, thus opening the circuit of the operating-motor and leaving the limit-switch in proper position for starting again.

If it is desired to stop the main motor at any time that the pressure in the reservoir is not at the upper limit, the push-button switch 24 may be closed, thus completing the relay-circuit through the coil 32 in practically the same manner as is done automatically by means of the pressure-gage relay.

It is conceivable that substantially the results herein set forth may be secured in substantially the same way without employing the same combinations of apparatus or the same arrangement of circuits, and I therefore desire it to be understood that my invention should be accorded sufficient scope to cover and include such variations from what is specifically shown and described.

I claim as my invention—

1. The combination with a main motor for operating pressure-producing apparatus, a rheostat for varying the current delivered to said motor having an arm movable over contact-terminals, and a reversible operating-motor for said rheostat-arm, of means for automatically reversing the operating-motor when the pressure generated by said apparatus respectively falls below and rises above predetermined limits, that comprises a main relay and a pressure-switch which is adapted to select and close the proper circuit therethrough and a manually-operated switch for bringing the main motor to rest.

2. The combination with a main motor for operating pressure-producing apparatus, a rheostat for varying the current passing through said motor having an arm movable over contact-terminals, and an operating-motor for said rheostat-arm, of a main relay for determining the direction of rotation of the operating-motor comprising switch-levers actuated by electromagnets each having a pick-up winding, and means for automatically energizing said winding that comprises a switch which is in communication with pressure-supplied apparatus, and a retaining-winding which is energized when the corresponding switch-lever is operated.

3. The combination with a main motor for operating pressure-producing apparatus, a rheostat for varying the current passing through said motor having an arm movable over contact-terminals, and an operating-motor for said rheostat-arm, of a main relay for determining the direction of the flow of energy in the armature of the operating-motor comprising switch-levers actuated by electromagnets each having a pick-up winding and a retaining-winding, and a second relay which is in communication with pressure-supplied apparatus and which is adapted to automatically close the circuits through one of said pick-up windings according as the pressure generated exceeds or falls below predetermined limits.

4. A system of motor control comprising a motor for operating pressure-producing apparatus, a rheostat for varying the current delivered to said motor and having an arm movable over contact-terminals, an operating-motor for said rheostat-arm, a limit-switch which is actuated by said rheostat-arm, a plurality of circuits for the operating-motor, a relay for completing the proper circuit therethrough, a pressure-switch in connection with said pressure-producing apparatus and adapted to automatically select the proper circuit through the main relay, and a manually-operated switch for bringing the main motor to rest.

5. The combination with a main motor for operating pressure-producing apparatus, a rheostat for varying the current delivered to said motor, and a reversible operating-motor for said rheostat, of a relay-switch for reversing the circuits of the operating-motor and a pressure-gage switch for changing the circuits of the relay-switch that may occupy either of two predetermined positions and is dependent upon the fluid-pressure produced by the apparatus, its position being changed when said pressure falls below or rises above predetermined limits.

In testimony whereof I have hereunto subscribed my name this 12th day of January, 1904.

HARVE R. STUART.

Witnesses:
Jos. W. ALEXANDER,
BIRNEY HINES.